United States Patent
Gotou

(10) Patent No.: US 6,197,443 B1
(45) Date of Patent: Mar. 6, 2001

(54) BATTERY CHAMBER STRUCTURE FOR USE IN ELECTRONIC DEVICE

(75) Inventor: Seiitirou Gotou, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/275,072

(22) Filed: Mar. 24, 1999

(30) Foreign Application Priority Data

Mar. 31, 1998 (JP) .................................................. 10-087032

(51) Int. Cl.[7] ....................................................... H01M 2/10
(52) U.S. Cl. ................................................................ 429/97
(58) Field of Search ..................................... 429/96–100

(56) References Cited

U.S. PATENT DOCUMENTS

| 4,391,883 | * | 7/1983 | Williamson et al. . |
| 5,645,954 | * | 7/1997 | Tamaru . |
| 5,804,332 | * | 9/1998 | Shimizu et al. . |
| 6,077,107 | * | 6/2000 | Hetherington . |
| 6,093,056 | * | 7/2000 | Donauer et al. . |

FOREIGN PATENT DOCUMENTS

| 57-50966 | 9/1980 | (JP) . |
| 4-102560 | 9/1992 | (JP) . |
| 5-54872 | 7/1993 | (JP) . |
| 9-259850 | 10/1997 | (JP) . |
| 9-306450 | 11/1997 | (JP) . |

* cited by examiner

Primary Examiner—Carol Chaney
Assistant Examiner—Susy Tsang
(74) Attorney, Agent, or Firm—McGuireWoods LLP

(57) ABSTRACT

A battery chamber structure of an electronic device is constructed such that it comprises a casing 2 of the electronic device, which is formed with a battery chamber 66 for resiliently holding a battery B between a spring terminal 65 and a fixed terminal provided in the battery chamber 66 and a cover member 63 equipped on the casing 2 for opening and closing the battery chamber 66, a lock piece 4 provided in the casing 2 for fixing the cover member 63 to and unfixing the cover member 63 from the casing 2 by reciprocating with respect to the casing 2 and a battery receiving piece 10 formed on the lock piece 4 for restricting a movement of the battery B in the battery chamber 66 in an axis direction of the battery B toward the spring terminal 65 in the battery chamber 66, the battery receiving piece 10 being adapted to move between a battery movement restriction position and a battery movement non-restriction position by the reciprocal movement of the lock piece 4. Thus, the reliability related to the power supply is improved and the loading/unloading of the battery becomes facilitated.

7 Claims, 6 Drawing Sheets

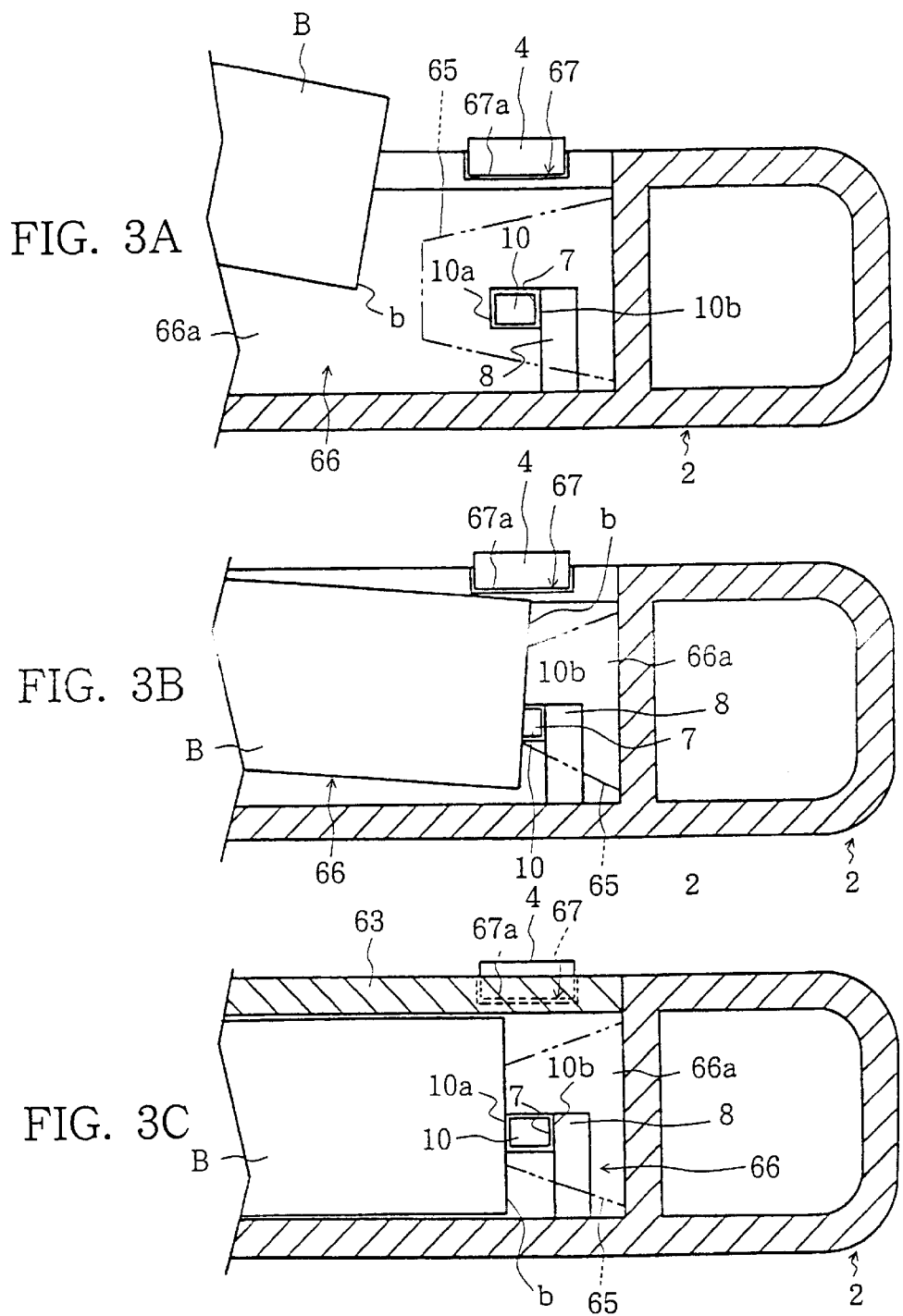

BATTERY CHAMBER STRUCTURE FOR USE IN ELECTRONIC DEVICE

CROSS REFERENCE TO RELATED APPLICATIONS

The present invention claims priority from Japanese Patent Application No. 10 087032 filed Mar. 31, 1998, the contents of which are incorporated herein by reference.

BACKGROUND OF THE INVENTION

1. Field of the Invention

The present invention relates to a battery chamber structure suitable for use in an electronic device such as a mobile communication device.

2. Description of Related Art

Recently, the use of portable information terminals such as various mobile communication media has been popularized at high rate. In such portable information terminal, a real time information is obtained by transmitting and receiving an information through the electronic mail or a facsimile by utilizing a telephone circuit or a portable radio equipment.

Conventionally, a battery chamber having a structure such as shown in FIG. 6 has been employed in such portable information terminal.

Describing the battery chamber structure 61 of this portable information terminal with reference to FIG. 6, the battery chamber structure 61 is equipped with a casing 62, a cover member 63 and a lock piece 64. The casing 62 is molded with a synthetic resin and has substantially a rectangular parallelepiped configuration. The casing 62 houses a communication equipment (not shown), etc., and has a battery chamber 66 for holding a battery B by pressing it by a spring terminal (negative terminal) 65 in the form of a frustum of a cone to a fixed terminal (positive terminal). A recess 67 is formed in the casing 62 on the side of the spring terminal 65 thereof. The recess 67 is opened in an upper surface portion 62a of the casing and, when the battery chamber 66 is closed by the cover member 63, communicates with a recess (not shown) formed in an inner surface of the cover member 63. The battery chamber 66 includes a back face portion 66a, left and right side face portions 66b (only one of them is shown) and a bottom face portion 66c and is formed by partially cutting away the upper surface portion 62a and a front surface portion 62b of the casing 62. A fitting portion 68 which extends in parallel to an axis direction of the battery B is formed in an edge portion of an opening of the bottom face portion 66c. The cover member 63 is L shape in cross section and is fitted in the fitting portion 68 of the casing 62 such that it can reciprocate along the fitting portion 68. The lock piece 64 can reciprocate in a space defined by the recess 67 of the casing 62 and the recess (not shown) of the cover member 63.

In this battery chamber structure, in order to load the battery B in the battery chamber 66, the fitting state between the casing 62 and the cover 63 is released to open the battery chamber 66 and the battery B is resiliently fitted between the spring terminal 65 and the fixed terminal (not shown). On the other hand, in order to remove the battery B from the battery chamber 66, the fitting state between the casing 62 and the cover 63 is released to open the battery chamber 66 and the spring terminal 65 is compressed to allow the battery B to be derived from the battery chamber 66 freely.

With the recent reduction of size and weight of an electronic device such as portable information terminal, the electronic device equipped with the battery chamber structure of this type is frequently carried in a bag of a user or in a pocket of his clothes. Therefore, there may be a case where such electronic device is erroneously dropped dependent on a state of use or dropped from the bag or the pocket dependent on an attitude of the user. As mentioned, the battery B is resiliently held between the spring terminal 65 and the fixed terminal (not shown). Therefore, when the electronic device is erroneously dropped and the battery B in the battery chamber 66 is shocked thereby, the shock power may move the battery B in a direction in which the spring terminal 65 is compressed and may be separated from the fixed terminal (not shown). In such case, a power is not supplied to electronic parts (not shown) within the casing 62, resulting in a degraded reliability in power supply.

In order to solve such problem, it may be considered to increase the spring constant of the spring terminal 65 to thereby rigidly support the battery B within the battery chamber 66. In such case, however, the insertion and/or replacement of the battery B with respect to the battery chamber 66 becomes difficult.

Incidentally, a battery chamber structure of an electronic device disclosed in Japanese Patent Application Laid-open No. Hei 9-259850 or Hei 9-306450 does not solve the above mentioned problem.

SUMMARY OF THE INVENTION

An object of the present invention is to provide a battery chamber structure of an electronic device, which can improve the reliability of power supply and with respect to which a battery can be easily inserted or replaced.

In order to achieve the above object, according to a first aspect of the present invention, a battery chamber structure of an electronic device comprises a casing of an electronic device, the casing being formed with a battery chamber for resiliently holding a battery between a spring terminal and a fixed terminal provided in the battery chamber, a cover member equipped on the casing for opening and closing the battery chamber, a lock piece provided in the casing for fixing the cover member to and unfixing the cover member from the casing by reciprocating with respect to the casing, a battery receiving piece formed on the lock piece for restricting a movement of the battery in the battery chamber in an axis direction of the battery toward the spring terminal in the battery chamber, the battery receiving piece being adapted to move between a battery movement restriction position and a battery movement non-restriction position by the reciprocal movement of the lock piece.

In this construction, when the battery receiving piece is positioned in the battery movement restriction position by the reciprocal movement of the lock piece, the movement of the battery held between the spring terminal and the fixed terminal in the axis direction of the battery toward the spring terminal is restricted. On the other hand, when the battery receiving piece is positioned in the battery movement non-restriction position by the reciprocal movement of the lock piece, the restriction of movement of the battery held between the spring terminal and the fixed terminal in the axis direction of the battery toward the spring terminal is released.

In this battery chamber structure, the battery receiving piece is preferably shifted by a pressing force generated by the movement of the battery toward the spring terminal within the battery chamber. That is, it is preferable to construct the battery chamber structure such that, when the battery receiving piece is pressed by the movement of the battery toward the spring terminal, the battery receiving piece is shifted in the direction of the pressing force.

The battery chamber structure may be constructed such that the cover member is slidable back and forth with respect to the casing and the battery chamber is closed by the movement of the cover member in a forward direction with respect to the casing and is opened by the movement of the cover member in a backward direction.

Alternatively, the battery chamber structure may be constructed such that the cover member is rotatable with respect to the casing and the battery chamber is closed by the rotation of the cover member in one direction with respect to the casing and is opened by the rotation of the cover member in the other direction.

It is preferable to provide a reinforcement rib on a portion of the battery receiving piece on an opposite side to the battery when the battery receiving piece is in the battery movement restriction position. When the battery receiving piece having such rib is shifted from the battery movement restriction position along the axis direction of the battery, the rib receives the shifting force.

According to a second aspect of the present invention, a battery chamber structure of an electronic device comprises a casing of the electronic device, the casing being formed with a battery chamber for resiliently holding a battery between a spring terminal and a fixed terminal provided in the battery chamber, a cover member equipped on the casing for opening and closing the battery chamber and a battery receiving piece formed on the cover member for restricting a movement of the battery in the battery chamber in an axis direction of the battery toward the spring terminal in the battery chamber, the battery receiving piece being adapted to move between a battery movement restriction position and a battery movement non-restriction position by the open/close operation of the cover member.

In this construction, when the battery receiving piece is moved to the battery movement restriction position by the open/close operation of the cover member, the movement of the battery held between the spring terminal and the fixed terminal in the axis direction of the battery toward the spring terminal is restricted. On the other hand, when the battery receiving piece is moved to the battery movement non-restriction position by the open/close operation of the cover member, the restriction of movement of the battery held between the spring terminal and the fixed terminal in the axis direction of the battery toward the spring terminal is released.

The battery chamber structure according to the second aspect of the present invention is preferably constructed such that, when the cover member is rotatably arranged with respect to the casing and the battery chamber is closed by the rotation of the cover member in one direction, the battery receiving piece is moved to the battery movement restriction position and restricts the movement of the battery held between the spring terminal and the fixed terminal toward the spring terminal within the battery chamber, and, when the battery chamber is opened by the rotation of the cover member in the other direction, the battery receiving piece is moved to the battery movement non-restriction position and the movement restriction of the battery toward the spring terminal is released.

Alternatively, the battery chamber structure may be constructed such that the cover member is slidable back and forth with respect to the casing and that, when the battery chamber is closed by the movement of the cover member in a forward direction with respect to the casing, the battery receiving piece is moved to the battery movement restriction position to restrict the movement of the battery held between the spring terminal and the fixed terminal toward the spring terminal within the battery chamber, and, when the battery chamber is opened by the movement of the cover member in a backward direction, the battery receiving piece is moved to the battery movement non-restriction position to release the movement restriction of the battery held between the spring terminal and the fixed terminal toward the spring terminal within the battery chamber.

BRIEF DESCRIPTION OF THE DRAWINGS

The present invention will be described in detail with reference to the accompanying drawings, in which:

FIGS. 3A to 3C are cross sections taken along a line B—B in FIG. 1, showing a relation between a battery and a battery receiving piece of the first embodiment;

DETAILED DESCRIPTION OF THE PREFERRED EMBODIMENTS

Figure 1:
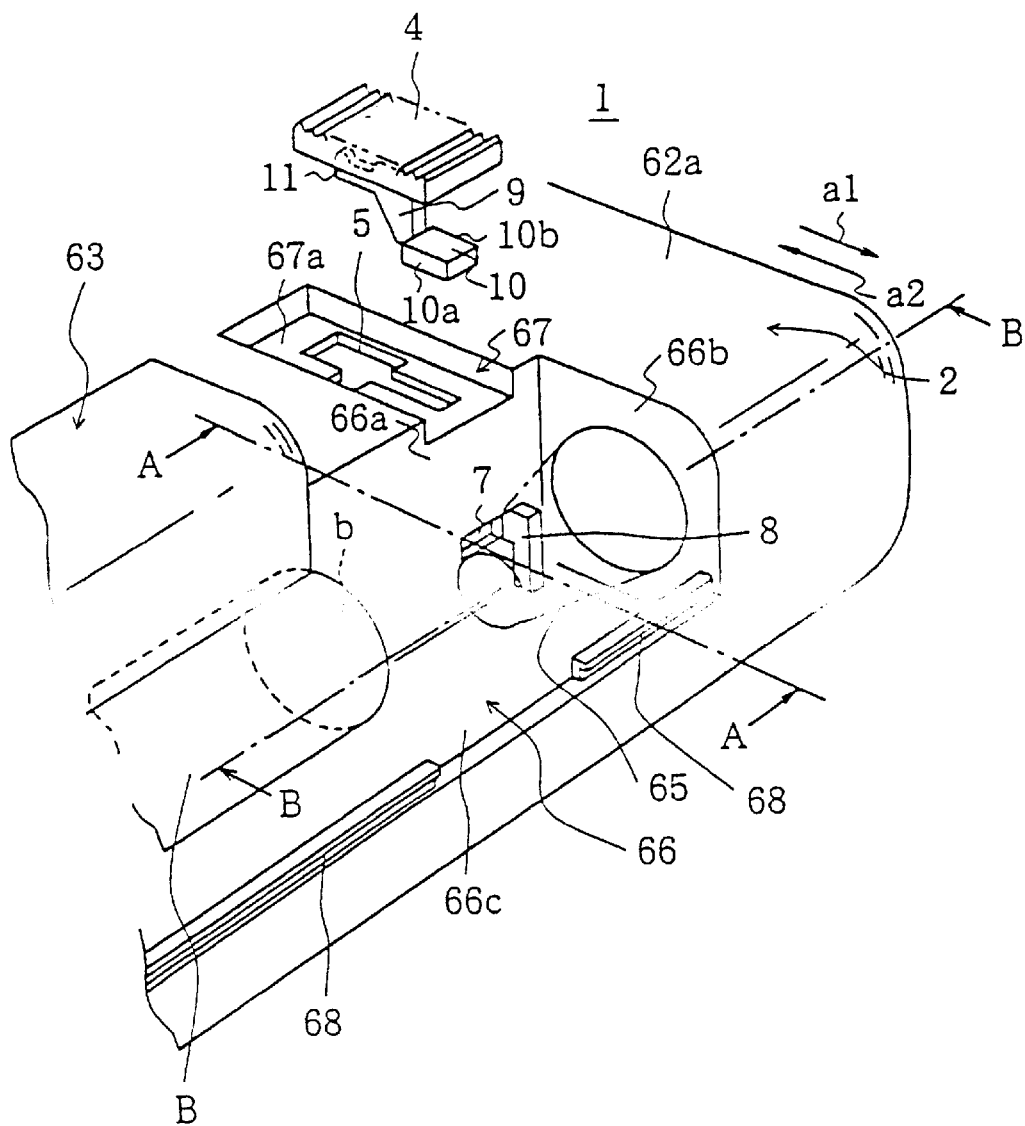
FIG. 1 is a disassembled perspective view of a battery chamber structure of an electronic device, according to a first embodiment of the present invention.
Figure 2A:
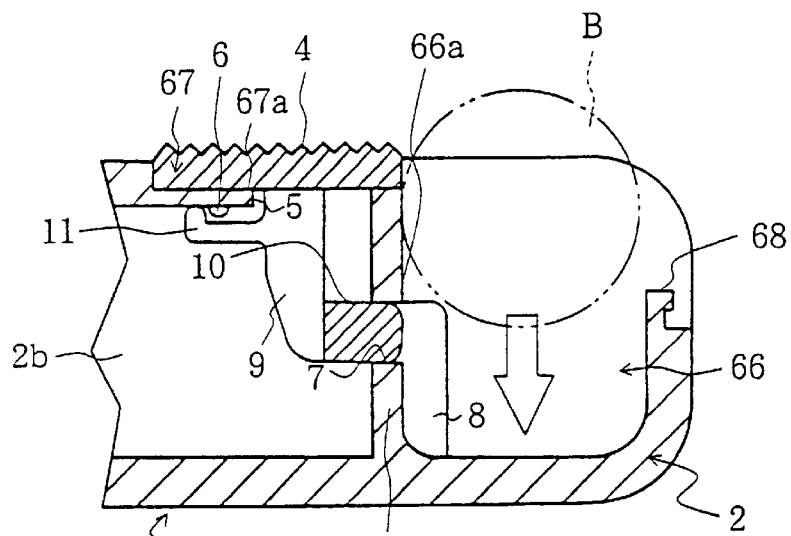
FIGS. 2A to 2C are cross sections taken along a line A—A in FIG. 1, showing a relation between a battery and a battery receiving piece of the first embodiment.
Figure 2B:
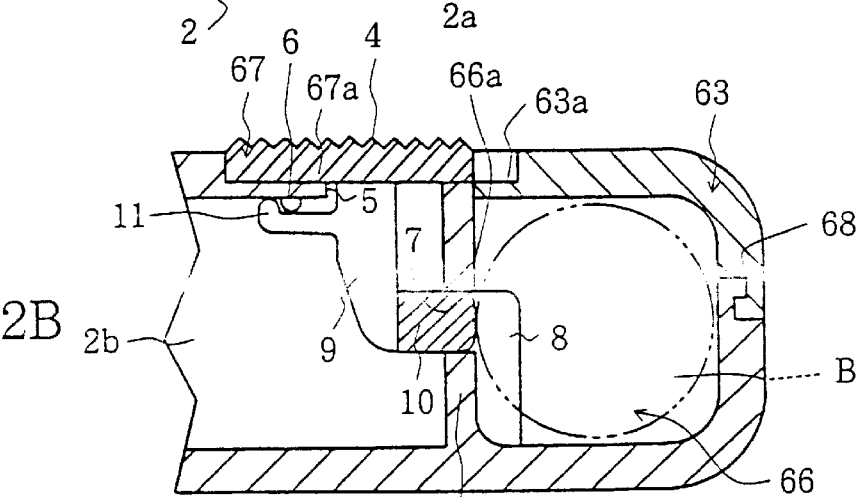
Figure 2C:
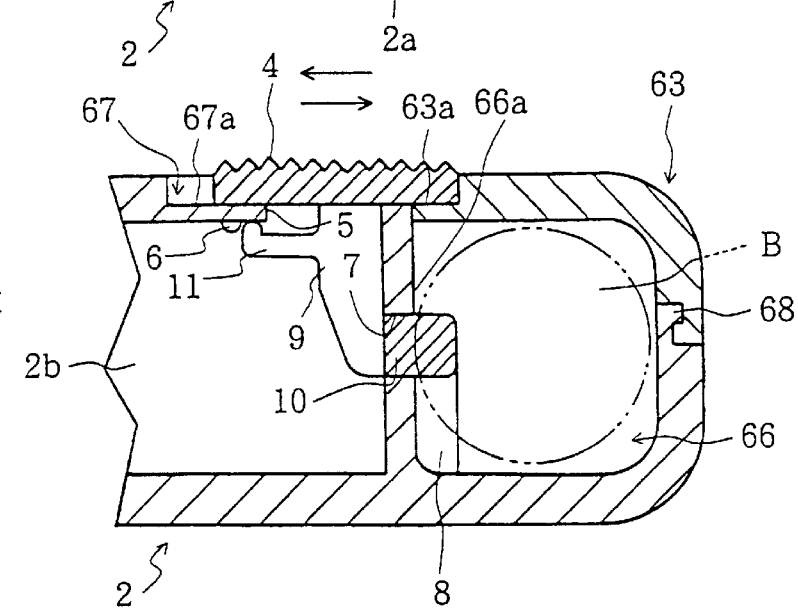
Figure 6:
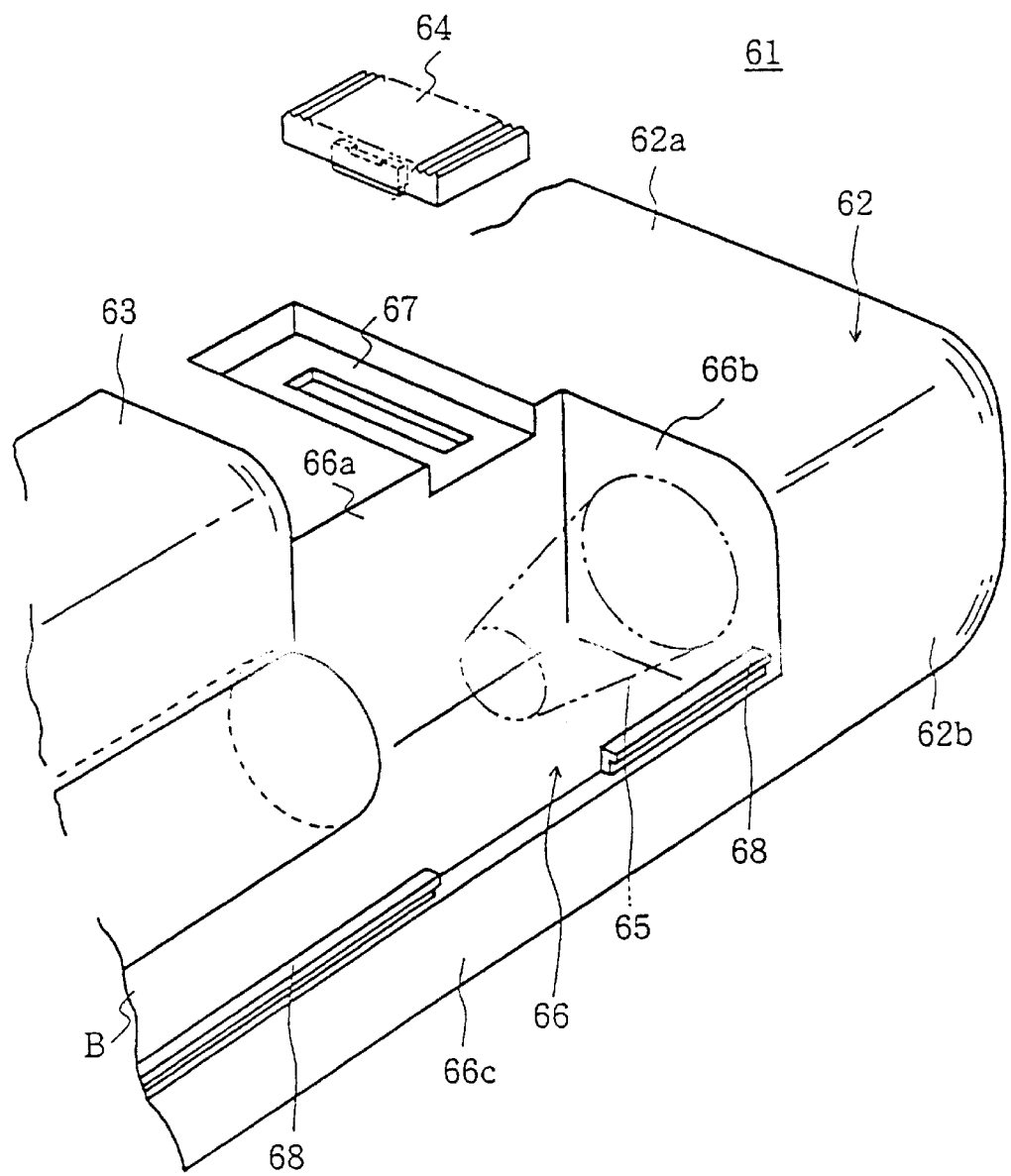
FIG. 6 is a disassembled perspective view of a conventional battery chamber structure of an electronic device.

FIG. 1 is a disassembled perspective view of a battery chamber structure of an electronic device, according to a first embodiment of the present invention, FIGS. 2A to 2C are cross sections taken along a line A—A in FIG. 1, showing a relation between a battery and a battery receiving piece of the first embodiment and FIGS. 3A to 3C are cross sections taken along a line B—B in FIG. 1, showing a relation between a battery and a battery receiving piece of the first embodiment, in which same members as those shown in FIG. 6 are depicted by same reference numerals, respectively, without detailed description thereof.

In FIGS. 1, 2A to 2C and 3A to 3C to 3C, a battery chamber structure 1 includes a casing 2 of an electronic device, a cover member 63 and a lock piece 4.

The casing 2 is molded with synthetic resin and includes a battery chamber 66 for resiliently holding a battery B between a spring terminal 65 and a fixed terminal (not shown) and a part chamber 2b adjacent to the battery chamber 66 through a partition wall 2a, for holding parts of a communication portion of the electronic device. A rectangular recess 67 is formed in an upper surface 62a of the casing 2 on a side of a spring terminal of the battery chamber 66. A recess 63a is formed in an upper surface of the cover member 63. The recess 63a communicates with the recess 67 when the cover member 63 is in a position in which the battery chamber 66 is closed by the cover member 63. An opening 5 is formed in a bottom wall 67a of the recess 67. The opening 5 extends in a direction along which the lock piece 4 reciprocates. A stopper 6 is formed on a lower surface of the bottom wall 67a and protrudes into the part chamber 2b.

A window 7 is formed in the partition wall 2a of the casing 2 and forms a communication path from the part chamber 2b to a portion of a side face 66a of the battery chamber 66, that is, a battery chamber side surface of the partition wall 2a of the part chamber 2b, which is substantially a center portion of the spring terminal 65 in the axial direction thereof. A reinforcing rib 8 is formed on a side edge of the window 7 on the side of an end face 66b of the battery chamber 66, that is, in the battery movement restriction position, and protrudes to a side portion of the spring terminal 65 in the battery chamber 66.

The lock piece 4 is arranged in a recess composed of the recess 63a of the cover member 63 in the closed state and the recess 67 of the casing 2 such that the lock piece 4 can reciprocate within the recess. Thus, when the lock piece 4 is moved to a lock position in a forward direction a1 with the battery chamber 66 being closed by the cover member 63, the cover member 63 is locked in the lock position. On the other hand, when the lock piece 4 is moved back from the recess 63a of the cover member 63 in a direction a2 to an unlock position in the recess 67 of the casing 2, the cover member 63 is unlocked.

A resiliently deformable holding piece 9 is integrally formed on a lower surface of the lock piece 4 and extends into the part chamber 2b. The holding piece 9 reciprocates in the directions a1 and a2 with the reciprocal movement of the lock piece 4. A battery receiving piece 10 is integrally formed on an end portion of the holding piece 9, for restricting the movement of the battery B in the axis direction thereof toward the spring terminal. The battery receiving piece 10 is generally parallelepiped in shape and has a battery receiving face 10a which corresponds to a negative electrode face b of the battery B and a rib side face 10b which corresponds to the rib 8 with the battery B is held within the battery chamber 66.

Thus, when the lock piece 4 moves forward to the lock position of the cover member 63 in the direction a1, the battery receiving piece 10 is moved from the battery movement non-restriction position within the window 7 to the battery movement restriction position within the battery chamber 66. On the other hand, when the lock piece 4 moves backward to the unlock position of the cover member 63 in the direction a2, the battery receiving piece 10 is moved from the battery movement restriction position within the battery chamber 66 to the battery movement non-restriction position within the window 7.

The term "battery movement restriction position" of the battery receiving piece 10 means a position within a stroke between a position of the battery receiving piece 10 before the holding piece 9 is resiliently deformed and a position of the battery receiving piece 10 after the holding piece 9 is resiliently deformed, in the state where the cover member 63 is forced to the lock state by the lock piece 4.

A resiliently deformable hook piece 11 is integrally formed on an intermediate portion of the holding piece 9 and protrudes therefrom in a direction opposite to the battery receiving piece 10. When the lock piece 4 is moved forward in the direction a1, the hook piece 11 is moved in the same direction while riding across the stopper 6. On the other hand, when the lock piece 4 is moved backward in the direction a2, the hook piece 11 is moved in the same direction while riding across the stopper 6.

Now, a loading operation of the battery B in the battery chamber constructed as mentioned above will be described with reference to FIGS. 2A to 3C.

First, the battery chamber 66 is opened by unlocking the cover member 63 locked to the casing 2 and, then, the battery B is pushed into the battery chamber 66 from the negative electrode face b thereof, as shown in FIGS. 2A and 3A. In this case, the lock piece 4 is positioned in the unlock position and the battery receiving piece 10 is in the battery movement non-restriction position.

Then, as shown in FIGS. 2B and 3B, a positive electrode face (not shown) of the battery B is pushed in the battery chamber 66 so that the latter is resiliently held between the spring terminal 65 and the fixed terminal (not shown). In this case, a distance between the battery side face of the rib 8 and the negative electrode face b of the battery b is set substantially the same as a width of the window 7 in the battery axis direction when the battery is loaded in the battery chamber.

Then, as shown in FIGS. 2C and 3C, the cover member 63 is fitted in the fitting portion 68 of the casing 2 and the lock piece 4 is moved forward from the unlock position to the lock position. In this case, the battery receiving piece 10 is moved from the battery movement non restriction position in the window 7 to the battery movement restriction position in the battery chamber 66 by the forward movement of the lock piece 4 and is resiliently held between the negative electrode face b of the battery B and the battery side face of the rib 8. In this manner, the battery can be loaded in the battery chamber.

Therefore, in this embodiment, even when the electronic device is erroneously dropped and a mechanical force exerted on the battery B to move it in a direction in which the spring terminal 65 is compressed is applied to the battery, the movement of the battery toward the spring terminal in the axis direction thereof is restricted by the battery receiving piece 10. In such case, when the mechanical force is applied from the battery B to the battery receiving piece 10 in the battery movement restriction position (initial position), the battery receiving piece 10 is moved in the compressing direction of the spring terminal 65 by the resilient deformation of the holding piece 9 and the rib 8 receives a mechanical force caused by this movement of the battery receiving piece 10.

Further, since there is no need of increasing the spring constant of the spring terminal 65 in this embodiment, the loading and unloading of the battery B with respect to the battery chamber 66 is facilitated.

Figure 4:
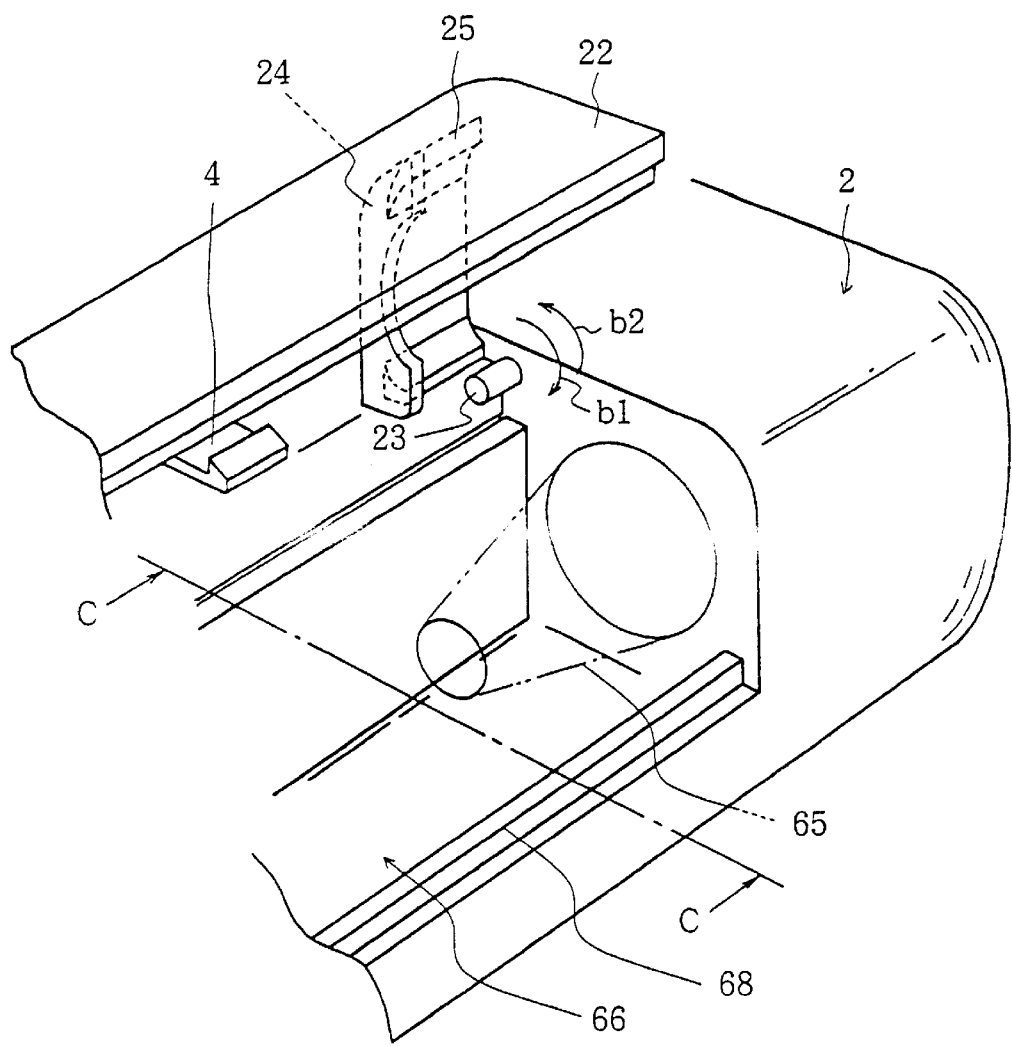
FIG. 4 is a perspective view of the battery chamber structure according to a second embodiment of the present invention.

A second embodiment of the present invention will be described with reference to FIGS. 4, 5A and 5B. FIG. 4 is a perspective view of the battery chamber structure according to the second embodiment of the present invention and FIGS. 5A and 5B are cross sections taken along a line C—C in FIG. 4, showing a relation between a battery and a battery receiving piece of the second embodiment, in which same members as those shown in FIG. 1 are depicted by same reference numerals, respectively, without detailed description thereof.

Figure 5A:
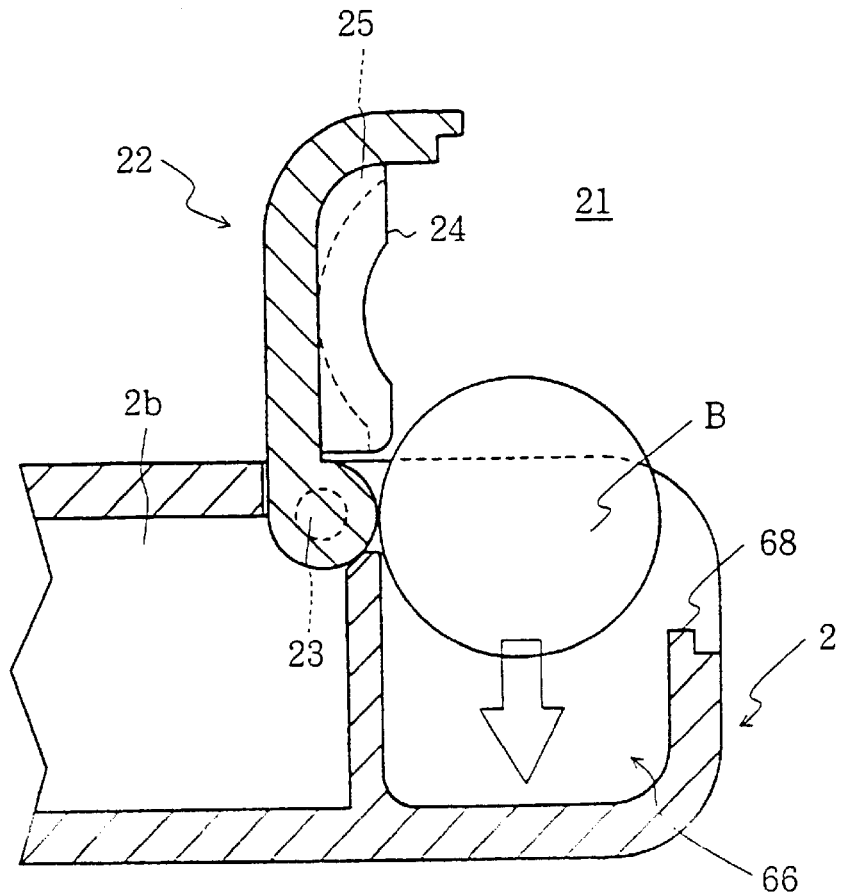
FIGS. 5A and 5B are cross sections taken along a line C—C in FIG. 4, showing a relation between a battery and a battery receiving piece of the second embodiment.
Figure 5B:
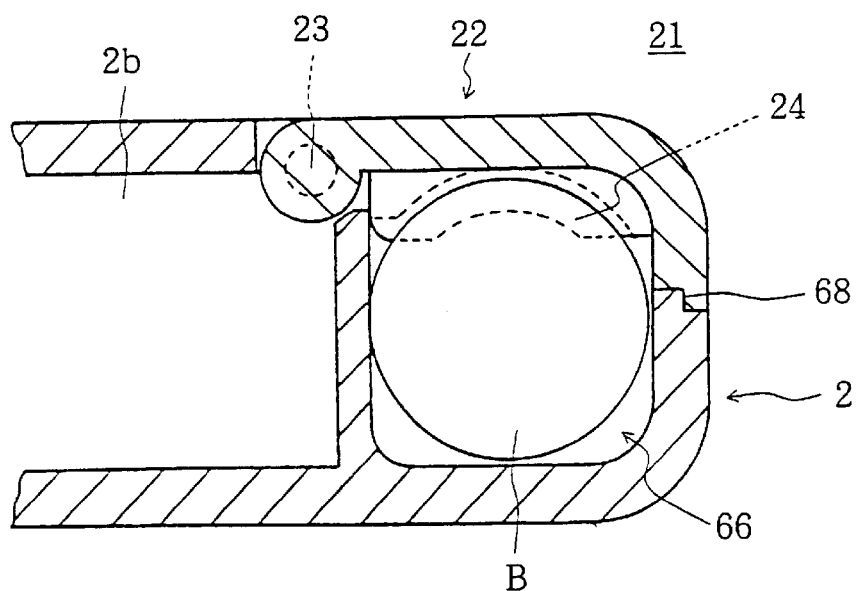

In FIGS. 4, 5A and 5B, the battery chamber structure depicted by a reference numeral 21 includes a casing 2, a cover member 22 and a lock piece 4.

A fulcrum 23 is formed on each of opposite end faces of a part chamber 2b of the casing 2. The fulcrums 23 (only one of them is shown) have one and the same axis line which is in parallel to an axis line of the battery B housed in the battery chamber 66 and protrude inward to each other.

The cover member 22 has an L-shaped cross section and is rotatably supported by the fulcrums 23. That is, the cover member 22 is rotated in a direction b1 to close the battery chamber 66 and in a direction b2 to open the battery chamber 66. A battery receiving piece 24 for restricting a movement of the battery B in a direction toward the spring terminal and a rib 25 are formed integrally on an inner surface of the cover member 22. The rib 25 is provided outside the battery receiving piece 24.

With such construction, when the battery chamber 66 having the battery B fitted therein is closed by rotating the cover member 22 in the direction b1, the battery receiving piece 24 is moved from a battery movement non-restriction position outside the battery chamber 66 to a battery movement restriction position within the battery chamber 66. On the other hand, when the battery chamber 66 is opened by rotating the cover member 22 in the direction b2, the battery receiving piece 24 is moved from the battery movement restriction position inside the battery chamber 66 to a battery movement non-restriction position outside the battery chamber 66.

Now, a loading operation of the battery B in the battery chamber constructed as mentioned above will be described with reference to FIGS. 5A and 5B.

First, as shown in FIG. 5A, the battery chamber 66 is opened by rotating the cover member 22 counterclockwise direction and, then, the battery B is pushed into the battery chamber 66 between the spring terminal 65 and the fixed terminal (not shown) in the battery chamber 66. In this state, the lock piece 4 is positioned in the unlock position and the battery receiving piece 24 is positioned in the battery movement non-restriction position.

Then, the battery chamber 66 is closed by rotating the cover member 22 in the direction in which the cover member 22 is fitted to a fitting portion 68. In this state, the lock piece 4 is moved from the battery movement non-restriction position outside the battery chamber 66 to the battery movement restriction position in the battery chamber 66 by this rotation of the cover member 22. In this manner, it is possible to load the battery in the battery chamber.

Therefore, in this embodiment, even when the electronic device is erroneously dropped and a power acting on the battery B to move it in a direction in which the spring terminal 65 is compressed is applied to the battery, the movement of the battery toward the spring terminal in the axis direction thereof is restricted by the battery receiving piece 24, as in the case of the first embodiment. Further, since there is no need of increasing the spring constant of the spring terminal 65 in this embodiment, the loading and unloading of the battery B with respect to the battery chamber 66 is facilitated as in the case of the first embodiment.

Incidentally, although the present invention was described with reference to the first embodiment shown in FIG. 1 in which the battery cover member 63 can reciprocate with respect to the casing 2 and the second embodiment in which the cover member 22 is rotatable with respect to the casing 2, The present invention is not limited thereto.

That is, the cover member 63 in the first embodiment is modified such that it is rotatable with respect to the casing 2 and the cover member 22 in the second embodiment may be modified such that it reciprocates with respect to the casing 2.

As described hereinbefore, according to the present invention, a battery chamber structure of an electronic device comprises a lock piece provided in a casing of the electronic deice for fixing a cover member to and unfixing the cover member from the casing by reciprocating with respect to the casing and a battery receiving piece formed on the lock piece for restricting a movement of the battery in the battery chamber in an axis direction of the battery toward the spring terminal in the battery chamber, the battery receiving piece being adapted to move between a battery movement restriction position and a battery movement non-restriction position by the reciprocal movement of the lock piece. Therefore, even when the electronic device is erroneously dropped and a power acting on the battery to move it in a direction in which the spring terminal is compressed is applied to the battery, the movement of the battery toward the spring terminal in the axis direction thereof is restricted by the battery receiving piece. Therefore, there is no case where the battery within the battery chamber is separated from the fixed terminal, so that the power is supplied to electronic parts in the casing, resulting in an improvement of the reliability related to the power supply. Further, since there is no need of increasing the spring constant of the spring terminal in this embodiment, the loading and unloading of the battery with respect to the battery chamber is facilitated.

What is claimed is:

1. A battery chamber structure of an electronic device, comprising:

a casing being formed with a battery chamber for resiliently holding a battery between a spring terminal and a fixed terminal provided in said battery chamber and a cover member equipped on said casing for opening and closing said battery chamber;

a lock piece provided in said casing for fixing said cover member to and unfixing said cover member from said casing by reciprocating with respect to said casing; and a battery receiving piece formed on said lock piece for restricting a movement of said battery in said battery chamber in an axis direction of said battery toward said spring terminal in said battery chamber, said battery receiving piece being, adapted to move between a battery movement restriction position and a battery movement non-restriction position by the reciprocal movement of said lock piece.

2. A battery chamber structure as claimed in claim 1, wherein said battery receiving piece is moved by a pressing force generated by the movement of said battery within said battery chamber toward said spring terminal.

3. A battery chamber structure as claimed in claim 1, wherein said cover member is reciprocally movable with respect to said casing.

4. A battery chamber structure as claimed in claim 1, wherein said cover member is rotatably provided with respect to said casing.

5. A battery chamber structure as claimed in claim 1, wherein a reinforcement rib is provided adjacent to said battery receiving piece in said battery chamber when the battery receiving piece is in the battery movement restriction position.

6. A battery chamber structure of an electronic device as recited in claim 1 wherein said battery receiving piece comprises a resilient hook which moves over a stopper when said lock moves between said battery movement restriction position and said battery movement non-restriction position.

7. A battery chamber structure of an electronic device as recited in claim 1 further comprising a window within said battery casing through which said battery receiving piece moves when said lock piece moves between a battery movement restriction position and a battery movement non-restriction position.

* * * * *